United States Patent [19]

Hanke et al.

[11] 4,425,556

[45] Jan. 10, 1984

[54] CERAMIC COLD CONDUCTOR AND METHOD OF PRODUCING THE SAME

[75] Inventors: Leopold Hanke, Beyharting; Helmut Schmelz, Prien, both of Fed. Rep. of Germany

[73] Assignee: Siemens Aktiengesellschaft, Berlin & Munich, Fed. Rep. of Germany

[21] Appl. No.: 259,908

[22] Filed: May 4, 1981

[30] Foreign Application Priority Data

May 19, 1980 [DE] Fed. Rep. of Germany ....... 3019098

[51] Int. Cl.$^3$ ............................................. H01C 7/02
[52] U.S. Cl. ................................... 338/25; 338/22 R
[58] Field of Search .................. 338/25, 22 R, 22 SD; 252/518, 520, 521; 29/610 R

[56] References Cited

FOREIGN PATENT DOCUMENTS 1415430 3/1969 Fed. Rep. of Germany.
2308073 10/1974 Fed. Rep. of Germany.
2626513 12/1977 Fed. Rep. of Germany.
2753766 6/1979 Fed. Rep. of Germany.
2838508 3/1980 Fed. Rep. of Germany .... 338/22 R

OTHER PUBLICATIONS

Leopold Hanke, Siemens Forsch.-u. Entwickl.-Ber. (Siemens Research and Development Reports), vol. 8, No. 4, (1979) pp. 209-213.
Chemical Abstracts, vol. 84 (1976) p. 666, paragraph 84:115054x.
Chemical Abstracts, vol. 84 (1976) p. 578, paragraph 84:143723h.

Primary Examiner—C. L. Albritton
Attorney, Agent, or Firm—Hill, Van Santen, Steadman & Simpson

[57] ABSTRACT

Ceramic cold conductors based on barium titanates having the general formula:

$$(Ba_{1-x}M^{II}{}_x)O \cdot z(Ti_{1-y}M^{IV}{}_y)O_2$$

wherein $M^{II}$ is selected from the group consisting of Ca, Mg, Sr and Pb; $M^{IV}$ is selected from the group consisting of Sn and Zr; x and y are numerals, the sum of which does not exceed one and z is a numeral in the range of 1.005 to 1.05, and containing one or more different doping elements, one of which (antimony, bismuth, niobium, lanthanum, yttrium or rare earth metals) in the barium titanate crystal lattice exhibits a predominant donor property and another of which (chromium, cobalt, copper, iron, manganese, nickel or vanadium) exhibits a predominant acceptor property, are produced by converting a mixture of appropriate starting materials into a conversion product, reducing the particle size of such conversion product, forming a body from such particles, sintering such body and subjecting the sintered body to a cooling and holding phase in special atmospheres to attain a final product. The doping element exhibiting donor property is present at a total concentration of 0.35 to 5 atomic percent in a Perowskite lattice and a doping element exhibiting acceptor properties is present at a total concentration of 0 to 2 atomic percent, with the proviso that the concentration of the doping elements is such that n-conductivity is present in the final product with a specific cold resistance, $\rho_{25°\,C.}$, of less than 10 ohm · cm.

4 Claims, 6 Drawing Figures

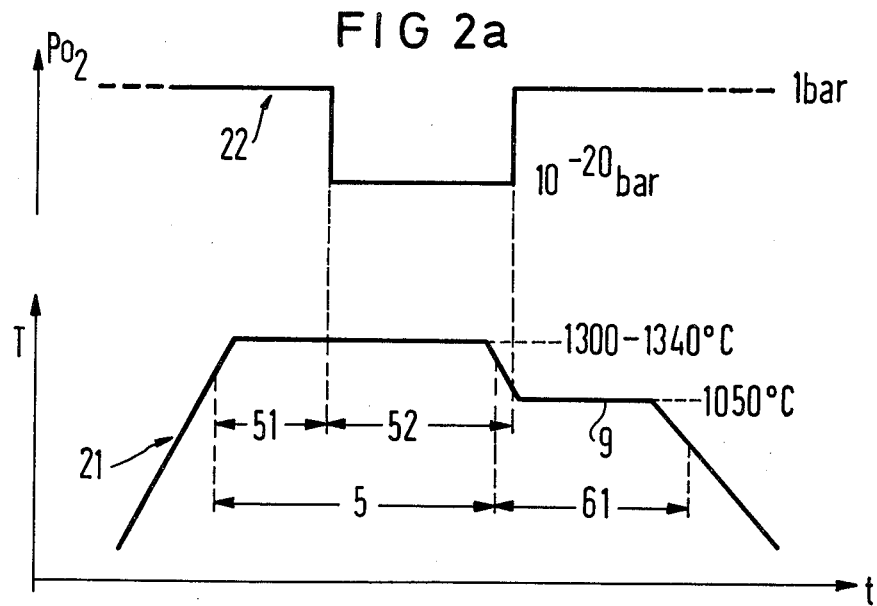
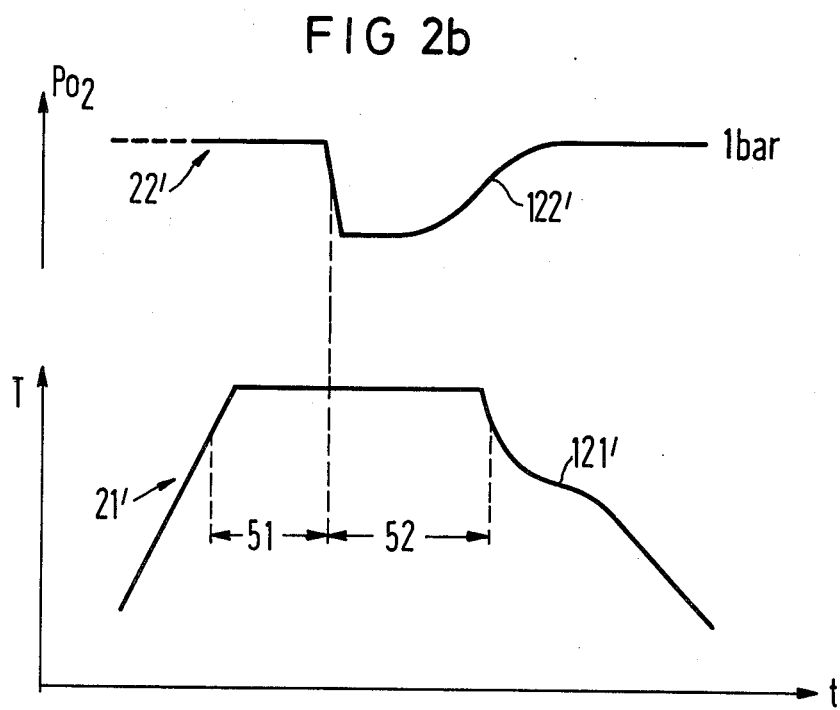

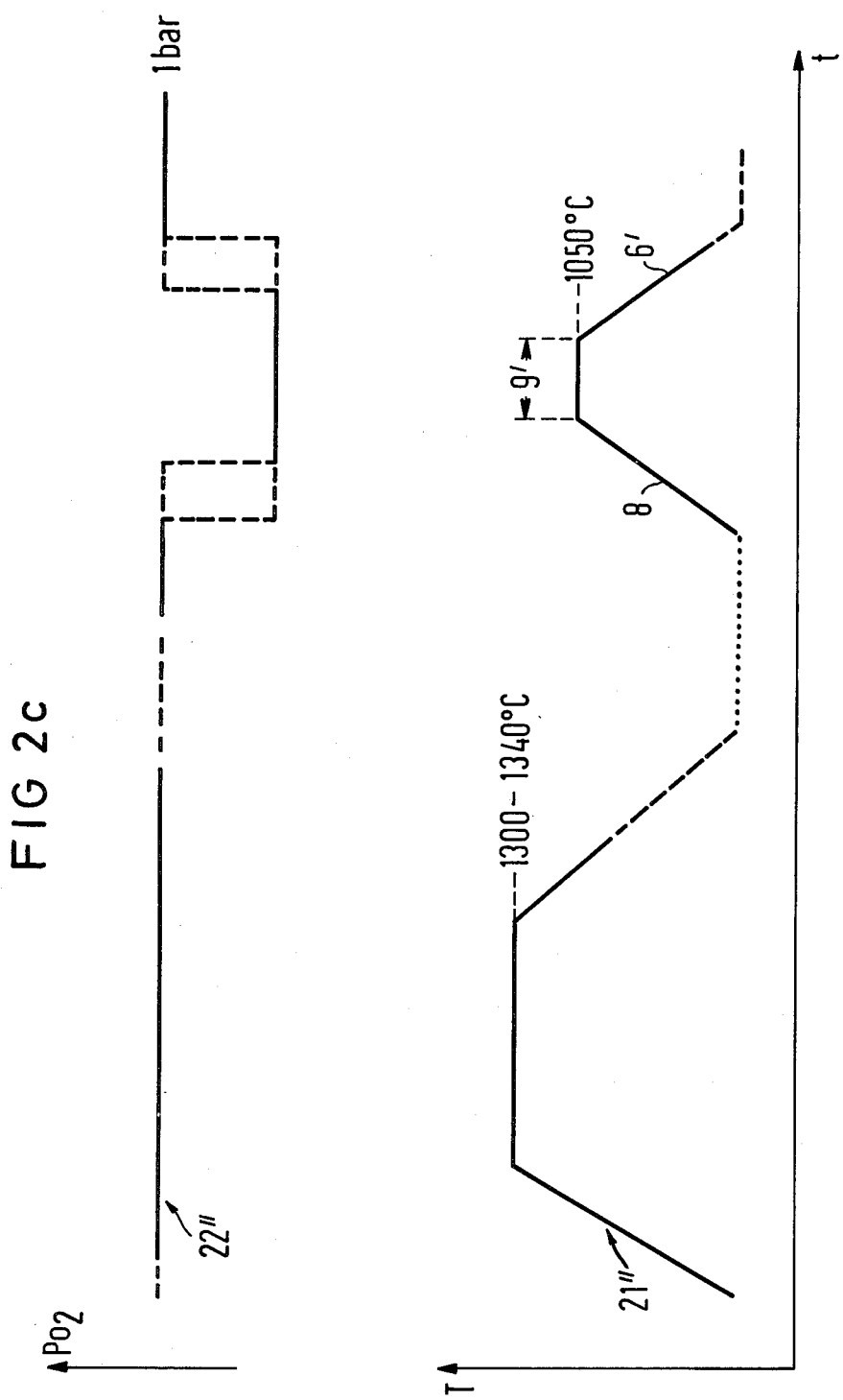

CERAMIC COLD CONDUCTOR AND METHOD OF PRODUCING THE SAME

BACKGROUND OF THE INVENTION

1. Field of the Invention

The invention relates to ceramic cold conductors and somewhat more particularly to ceramic cold conductors based on barium titanate and methods of producing such conductors.

2. Prior Art

Ceramic cold conductors (sometimes referred to as ceramic PTC) generally are comprised of barium titanate, which in itself, when sintered in an oxidizing atmosphere, is a high ohm dielectric. However, with the additions of appropriate doping elements, such as for example, antimony, lanthanum, yttrium and other rare earth metals, such barium titanate can be made conductive for use as a ceramic cold conductor. Specifically, such ceramic PTCs exhibit a substantially large increase of specific electrical resistance for such material in a relatively narrow temperature range, that is at the Curie temperature of the material, which is known for such cold conductors as the resistance with a positive temperature coefficient (PTC).

With appropriate doping, attainable specific cold resistance values for a given ceramic cold conductor material is at least about 10 ohm.cm because higher dopant concentrations cause increases in the resistance. This phenomena, as was established, is connected with the prevention of grain growth during sintering by the presence of a relatively high amount of doping elements. Even in such highly doped barium titanate, there arises at high temperatures, barium vacancies which can compensate for the effect of the doping and which are enriched at the grain boundaries so that high ohm surface layers or zones develop in individual crystallites. These surface layers are necessary, on the one hand for the actual cold conductance effect, however, on the other hand, in instances of grain size below about 1 μm, such surface layers extend over the total grain volume so that no conductivity at all can occur. Further details of this phenomena can be derived from the literature, for example, from "Siemens Forschungs-und Entwicklungsberichte", (Siemens Research and Development Reports), Vol. 8, No. 4, (1979), pages 209 et seq.

In many applications, cold conductors have a low degree of cold resistance are desired. Cold resistance is defined as the resistance value at a normal operating temperature, for example, room temperature or 25° C., that is, at a temperature far below the reference, or Curie temperature. Such low resistance values were attained heretofore the individual cold conductor bodies by providing such bodies with correspondingly larger disc surfaces and smaller thicknesses. However, such conductor body shapes require a substantial increase of space.

SUMMARY OF THE INVENTION

The invention provides a ceramic cold conductor material having a relatively low cold resistance, in comparison to prior art materials, and a method of producing such cold conductor materials.

In accordance with the principles of the invention, ceramic cold conductors of the invention are based on barium titanates having the general formula:

$$(Ba_{1-x}M^{II}{}_x)O \cdot z(Ti_{1-y}M^{IV}{}_y)O_2 \quad (I)$$

wherein $M^{II}$ is selected from the group consisting of Ca, Mg, Sr and Pb;

$M^{IV}$ is selected from the group consisting of Sn and Zr;

x and y are numerals whose sum is less than one; and z is a numeral ranging from 1.005 to 1.05 and containing one or more different doping elements, one of which (antimony, bismuth, niobium, lanthanum, yttrium or a rare earth metal) in the barium titanate crystal lattice exhibits a predominantly donor property and another of which (chromium, cobalt, copper, iron, manganese, nickel or vanadium) exhibits a predominant acceptor property.

An appropriate mixture of starting materials yielding the above general formula (I) are admixed into substantially uniform mass, converted into a conversion product, pulverized and formed into a desired body. This body is subjected to sintering conditions, first in an oxidizing atmosphere and then in a reducing atmosphere and thereafter the sintered body is subjected to a cooling step, first in a reducing atmosphere and then in an oxidizing atmosphere. Next, the cooling body is subjected to a holding step in an oxidizing atmosphere to attain a final product.

The doping element exhibiting a donor property is present at a total concentration of 0.03 to 5 atomic percent in a Perowskite lattice and the doping element exhibiting an acceptor property is present at a total concentration of 0 to 2 atomic percent, with the proviso that the concentration of doping elements in the above barium titanate is such that n-conductivity is present in the final product with a specific cold resistance, $\rho_{25° C.}$, of less than 10 Ohm.cm.

In accordance with the principles of the invention, a higher (relative to the prior art) effective dopant concentration is provided and a coarser (relative to the prior art) grain structure in the cold conductor material is maintained.

During heretofore known processes of producing barium titanate materials, a reduction atmosphere was provided so as to make the resultant barium titanate conductive through reductions, while any oxygen vacancies which arise, functioned as a dopant. Under these conditions, practically no barium vacancies occur, which can lead to high ohm surface layers or zones. Further, under these conditions, even finely granular materials become conductive. Such a material, however, fails to exhibit any sort of properties which at least are characteristic for ceramic cold conductor materials. Accordingly, observations regarding a use of reduction atmosphere lie outside of such considerations which relate to cold conductors.

However, it has now been discovered that by at least partially sintering in a reduction atmosphere, even highly doped barium titanate attains a grain structure which is essentially sufficient for cold conductor characteristics to arise. Highly doped barium titanate which is totally sintered in a reducing atmosphere has no cold conducting properties for reasons mentioned above.

A further significant feature of the invention is to subject this relatively coarse-grained ceramic material to a further heat treatment in an oxidizing atmosphere whereby oxygen vacancies, which arise in highly doped barium titanates, are again eliminated and barium vacancies are generated in such spatial distribution as is known and necessary for cold conductor materials. This oxidizing treatment can be undertaken either in its own tempering process (subsequently) or it can occur during the cooling step after completion of the actual sintering step on the ceramic materials. It is essential for either of these alternative steps that the temperature maintained during the presence of the oxidizing atmosphere is far enough below the sintering temperature that the coarsely divided structure of the ceramic body which forms at the sintering temperatures in a reducing atmosphere cannot and does not change. Because the mobility of barium vacancies in the crystal lattice of barium titanate is significantly lower than that of oxygen vacancies, the imminent goal of the invention can be attained to a large extent quantitatively by again eliminating the oxygen vacancies generated during the first step in a reducing atmosphere. Accordingly, optimum results are attained by a time-and/or temperature-dependent selection of oxygen partial pressure during the subsequent (re) oxidation process.

The reducing atmosphere utilized in the actual sintering step in the initial portion of the inventive process, particularly with its inclusion at the termination of the sintering step, functions to generate a coarse structure in the ceramic material whereas, and in contrast, in the prior art a reducing atmosphere was utilized to generate high electrical conductivity. With the invention, the low specific cold conductor resistance of a final product (which in addition also has the required cold conductor properties) is attained by utilizing a relatively high dopant concentration and by utilizing an oxidizing step at a temperature below the sintering temperature.

BRIEF DESCRIPTION OF THE DRAWINGS

FIGS. 2a, 2b and 2c are diagrammatic illustrations of temperature-time curves used in the inventive process, together with associated oxygen partial pressure curves utilized during such temperature-time conditions;

DESCRIPTION OF PREFERRED EMBODIMENTS

Figures 1, 4:
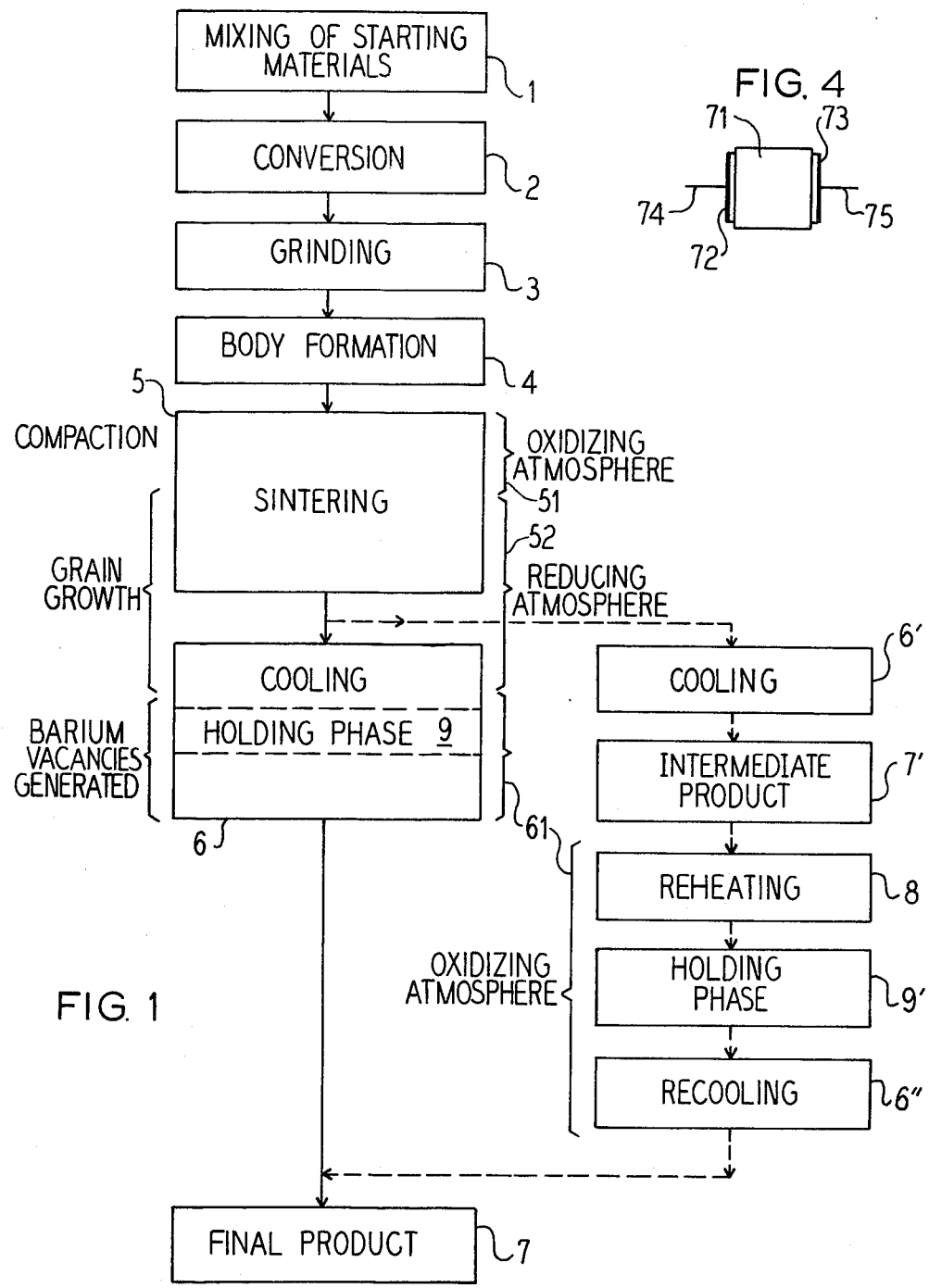
FIG. 1 is a schematic flow chart illustrating the course of the inventive process for producing a cold conductor.
FIG. 4 is a somewhat schematic view of a cold conductor device produced in accordance with the principles of the invention.

Generally, the overall process of the invention is illustrated at FIG. 1. At step 1, appropriate amounts of starting materials, such as barium carbonate, titanium dioxide and select dopants (further defined in formula I, above) are admixed into a substantially homogeneous mass. At step 2, this admixture of starting materials is converted in a per-se known manner, into doped barium titanate. At step 3, the converted material is ground or pulverized into relatively uniform small size particles and at step 4, the ground-up material is admixed with a suitable binder and formed into a body. At step 5, the body is subjected to sintering conditions. At step 6, the sintered body is cooled, whereby in accordance with the principles of the invention, where applicable, a dwell period or holding step 9 can be provided at an essentially constant temperature in comparison to the cooling rate. At step 7, a finished product is attained.

On the right-hand side of the flow diagram of FIG. 1, the approximate intervals of each respective atmosphere present at a given step are indicated while on the left-hand side the predominant reaction or process occurring at that step is indicated. Thus, during the initial portion of the sintering step, at which an oxidizing atmosphere 51 is present, a compaction of the material in the formed body occurs so that a substantially non-porous body is attained. Later, when a reduction atmosphere 52 is present, grain growth begins. As shown, the reduction atmosphere 52 is also present and extends into the cooling step 6. An oxidizing atmosphere 61 is then provided for the latter portion of the cooling (holding phase) step. On the far righthand side of the flow diagram, an alternative sequence of a cooling 6', attainment of an intermediate product 7', a reheating 8, a holding 9' and a re-cooling 6" step sequence is shown intergrated into the general overall process explained above.

FIGS. 2a and 2b are graphical illustrations with time extending along the abscissa and temperature extending along the ordinate for curves 21 and 21' and oxygen partial pressure extending along the ordinate for curves 22 and 22', respectively. The designated numerical values are exemplary values which allow the order of magnitude in each instance to be rapidly identified.

Curves 21 and 21' schematically illustrate temperature conditions prevailing at the respective atmospheres 51, 52 and 62, described earlier. The broken-line initial and final boundaries are not exactly determined nor particularly crucial for the practice of the invention. The overlap of the individual steps or atmospheres, such as 5, 51 and 52 or 6, 52 and 61, permit the essential concepts of the invention to be easily recognized from these figures.

For example, in FIG. 2b, the time-dependency of the oxygen partial pressure curve 122' can be readily determined. By selection of a chronological event on curve 121' and a chronological event on curve 122', and particularly by selection of these chronological events on these two curves (which events are adjustable relative to one another), cold conductor properties of a low ohm cold conductor material produced in accordance with the principles of the invention can be varied in detail.

Referring back to FIG. 1, an alternative sequence for the cooling and holding phase described earlier includes a subsequent re-heating step 8 and a re-cooling step 6', both of which occur in the oxidizing atmosphere 61. In instances where this alternative embodiment is practiced, after the sintering step 5 and initial cooling step 6', an intermediate product 7' is obtained which, at this stage, does not exhibit any cold conductor property. However, such cold conductor property must be present when a final product is attained at step 7. Thus, the intermediate product is re-heated, subjected to a holding phase and re-cooled to generate the requisite cold conductor property. FIG. 2c illustrates a time-temperature-oxygen partial pressure relation similar to those of FIGS. 2a and 2b, for this alternative embodiment, with a temperature curve 21" and an oxygen partial pressure curve 22".

At FIG. 4, an exemplary form of a final cold conductor product is illustrated as comprised of a relatively small plate or body 71 having electrodes 72 and 73 located on spaced-apart surfaces of body 71. The electrodes are preferably composed of aluminum because it forms a blockless contact with cold conductor materials. Suitable electrical leads 74 and 75 can be provided for each electrode.

In order to enable workers in this art to better understand the principles of the invention an exemplary embodiment thereof is now set forth. However, it is to be understood that this exemplary embodiment is not to be construed as limiting the scope of the invention in any way.

In the exemplary embodiment, the cold conductor composition was comprised of 98 atomic percent barium and 102 atomic percent titanium. The best combination of cold resistance and cold conductor behaviour was attained with additions of 2 atomic percent yttrium, however, the yttrium constituent can be varied between about 0.5 to 5 atomic percent. A further constituent was 0.2 atomic percent manganese, which can be varied between about 0 and 1 atomic percent. Further, one atomic percent of silicon was present in the exemplary formulation. Without silicon, a higher steepness of the resistance rise can be attained, however, then a loss relative to the varistor effect must be accepted. The remainder of the exemplary formulation was oxygen.

The starting materials required to yield the above formulation were converted, after grinding and mixing, at temperatures between about 1,000° to 1,150° C., preferably at about 1,050° C. over a prolonged time span, preferably about 4 hours. This conversion time span can vary between about 2 and 10 hours and is somewhat dependent on the quantity of material to be converted.

A cold conductor having the above composition was sintered and cooled (further details of which are set forth below) in accordance with the principles of the invention and exhibited the following technical properties:

$\rho_{25° C.}$ 5 Ohm.cm/$\rho_{max}/\rho_{min}$ approximately $10^4$;

$\rho_{max}(40$ V/mm$)/\rho_{max}(1$ V/mm$)=60\%$, which is equal to the load factor; and Reference temperature, at which the specific resistance, $\rho$, has risen to double the value $\rho_{min}$, was 120° C. (approximately equal to the Curie temperature).

The above material, after conversion, pulverization and body formation, was sintered in an oxygen stream having a oxygen partial pressure, $P_{O2}$, equal to approximately 1 bar at a heating rate of about 3° to 10° K./min, preferably at a heating rate of 5° K./min until a sintering temperature of about 1300° to 1340° C. was attained. For the transition from atmosphere 51 to atmosphere 52, a flushing of the sintering furnace was undertaken with pure nitrogen. It may also occur by evacuating the sintering furnace until the oxygen partial pressure is below about 0.01 bar. This is necessary so that with the subsequent introduction of a reduction atmosphere (mixture of nitrogen and hydrogen) no explosions occur. In the reduction atmosphere (sometimes referred to as a forming gas atmosphere), the oxygen partial pressure was about $10^{-23}$ bar. During the treatment under atmosphere 52, sintering continued for about 30 minutes at the sintering temperature set forth above. Then, a cooling occurred, initially in the reduction atmosphere described above at a cooling rate of about 3° to 15° K./min, and preferably at about 10° K./min. Once the temperature dropped to about 900° to 1200° C., preferably 1050° C., the holding phase 9 commenced at essentially constant temperatures (900° to 1200° C., preferably 1050° C.) and lasted for about 1 to 10 hours, preferably 2 hours.

After termination of this holding phase, the furnace was again flushed with pure nitrogen (to avoid explosions) and a transition to an oxidizing atmosphere, with a $P_{O2}$ of 1 bar, occurred. Further cooling then proceeded with normal cooling of the furnace at a rate of about 5° K./min.

The alternative post-sintering process mentioned earlier, with a separate tempering process, is advantageous because an operator can cool a sintered body in a reducing atmosphere practically to room temperature and then, without a danger of explosion, can commence re-heating (step 8 of FIG. 1) directly in an oxidizing atmosphere without a special flushing or the like.

The above stated preferred values refer to a single exemplary embodiment. The value ranges stated in each case relate to other exemplary embodiments of the invention.

A cold conductor material having a composition in accordance with formula I above, has a higher effective dopant concentration, relative to the prior art. As stated, as a rule, an acceptor dopant is present, however, only to such an extent that the cold conductor material containing such dopant is n-conductive. The effective difference between donor dopant and acceptor dopant concentration is the effective dopant, which in the case of the present invention is higher than previously customary or even possible in the prior art.

Figure 3:
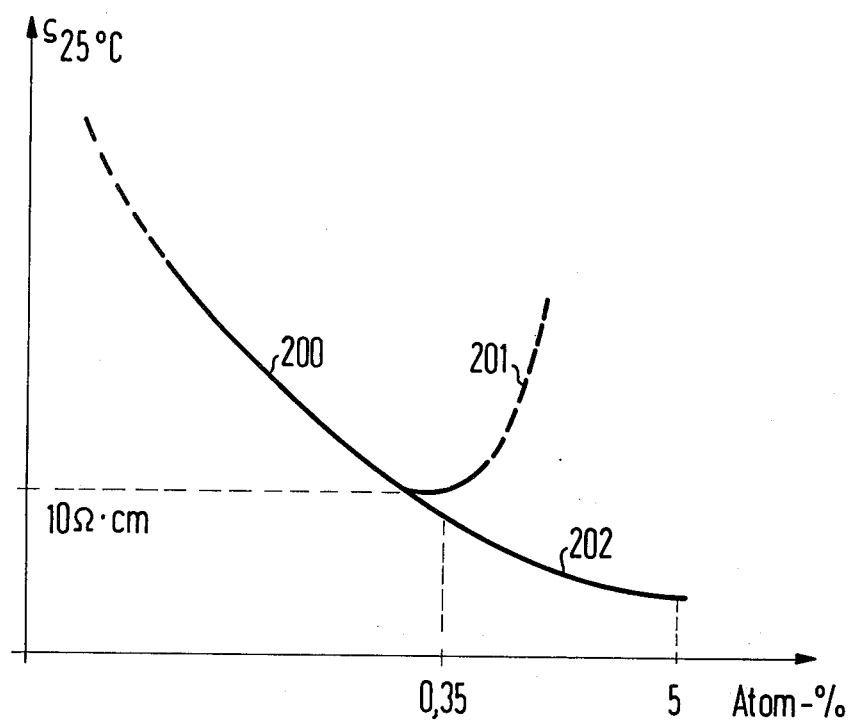
FIG. 3 is a resistance diagram illustrating the relation between dopant concentration and specific cold conductor resistance.

FIG. 3 illustrates a diagram useful for further explanation of this aspect of the invention. The specific cold conductor resistance, $\rho_{25° C.}$ of a cold conductor material is entered along the ordinate. The amount of effective dopant concentration corresponding to the above explanation is entered along the abscissa. Curve 200, with a renewed rise of specific resistance at a dopant concentration of over 0.35 atomic percent, represents the prior art. This rise of specific resistance occurs for a cold conductor of the known type having a too high a dopant concentration. In the broken-line curve region 201, one no longer can talk of a cold conductor property. The curve region 202 extending beyond the 0.35 atomic percent dopant concentration, that is between about 0.35 and 5 atomic percent, corresponds to cold conductors produced in accordance with the principles of the invention. The difference between curve regions 201 and 202 clearly show the particularity of the invention. In other words, at this increased effective dopant concentration, still lower specific cold resistance is attained with maintenance of the cold conductor property, as a result of a maintained grain structure. The effective dopant concentration is the dopant concentration which is effective for the desired results, which, as a rough approximation, is equal to the difference between the donor and acceptor dopant concentration.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. A ceramic PTC resistor based on a barium titanate crystallite having the general formula:

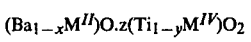

$(Ba_{1-x}M^{II})O.z(Ti_{1-y}M^{IV})O_2$ wherein $M^{II}$ is selected from the group consisting of Ca, Mg, Sr and Pb;

$M^{IV}$ is selected from the group consisting of Sn and Zr;

x and y are numerals, the sum of which does not exceed one; and z is a numeral ranging between 1.005 to 1.05, said crystallite containing at least two different doping substances therein, with a first doping substance being selected from a group consisting of antimony, bismuth, lanthanum, niobium, yttrium and a lanthanide and exhibiting in the interior of the crystallite a predominant donor property and with a second doping substance being selected from the group consisting of chromium, cobalt, copper, iron, manganese, nickel and vanadium and exhibiting in the interior of the crystallite a predominant acceptor property;

said resistor being formed by substantially uniformly admixing appropriate starting materials yielding said barium titanate crystallite, converting said admixture into a converted doped barium titanate, grinding such converted doped barium titanate into relatively uniform size particles, forming a body from such particles, and sintering said body to obtain a final PTC resistor product which is characterized by the following features:

(A) said final PTC resistor product containing a total concentration of 0 to 2 gram atomic percent of said doping substance exhibiting an acceptor property;

(B) said final PTC resistor product containing so much of said doping substance exhibiting a donor property that the effective concentration of the total doping substances placed in a Perowskite lattice of said crystallite, pursuant to maintaining coarse granularity, is 0.35 to 5 gram atomic percent;

(C) the concentration of doping substances in said final PTC resistor product being such that n-conduction is present in the PTC product with a specific cold resistance of less than 10 ohm.cm, measured at 25° C.;

(D) said sintering of the formed body occurring over a space of time in an atmosphere which reduces the barium titanate and allows a sufficient grain growth to be attained; and, (E) after cooling-off to a temperature below the sintering temperature, subjecting the so-cooled sintered body to a tempering process in an oxidizing atmosphere for a period of time until the number of barium vacancies generated in the material of said body is sufficient for the occurance of the PTC resistor property.

2. A ceramic PTC resistor as defined in claim 1 wherein, in said feature (E), said tempering process in said oxidizing atmosphere is integrated into said cooling-off step after said sintering step.

3. A ceramic PTC resistor as defined in claim 1 wherein, in said feature (E), said tempering process in said oxidizing atmosphere is further conducted with said so-called sintered body, obtained after said sintering and said cooling off by re-heating and re-cooling in said oxidizing atmosphere.

4. A ceramic PTC resistor as defined in claim 1 wherein, in said feature (E), during said tempering process in said oxidizing atmosphere, an oxygen partial pressure which changes in dependence on time is provided.

* * * * *